United States Patent [19]

Roush et al.

[11] Patent Number: 4,790,996

[45] Date of Patent: Dec. 13, 1988

[54] PROCESS FOR PREPARING CEREAL PRODUCTS

[75] Inventors: Thomas M. Roush, Battle Creek; Charles T. Stocker, Augusta, both of Mich.

[73] Assignee: General Foods Corporation, White Plains, N.Y.

[21] Appl. No.: 61,058

[22] Filed: Jun. 10, 1987

[51] Int. Cl.$^4$ .............................................. A21D 6/00
[52] U.S. Cl. .................................. 426/458; 426/447; 426/505; 426/516
[58] Field of Search ............... 426/447, 448, 456, 458, 426/505, 516, 517; 99/348

[56] References Cited

U.S. PATENT DOCUMENTS

| | | | |
|---|---|---|---|
| 2,513,106 | 6/1950 | Prendergast | 425/72 R |
| 4,126,706 | 11/1978 | Hilton | 426/458 |
| 4,286,935 | 9/1981 | Okuno et al. | 425/72 R |
| 4,540,592 | 9/1985 | Myer et al. | 426/516 |

Primary Examiner—George Yeung
Attorney, Agent, or Firm—Sam D. Walker; Thomas R. Savoie; Daniel J. Donovan

[57] ABSTRACT

The present invention is concerned with an apparatus and process for preparing different varieties of ready-to-eat cereal products utilizing substantially the same process comprising: an extruder and a hollow attachment connected at the discharge end of the extruder, said attachment being of sufficient area and length to sufficiently completely cook the food product in an enclosed environment; the food product being a farinaceous material which is fed to the extruder where it is mixed with sufficient moisture to form a dough and extruded for a time and at a temperature and pressure effective to commence the cooking process and wherein the heated dough passes into the hollow attachment connected at the discharge end of the extruder where the cooking is completed. The cooked dough exiting the extruder is cooled, shaped in its desired form and toasted to its desired final moisture content.

23 Claims, 1 Drawing Sheet

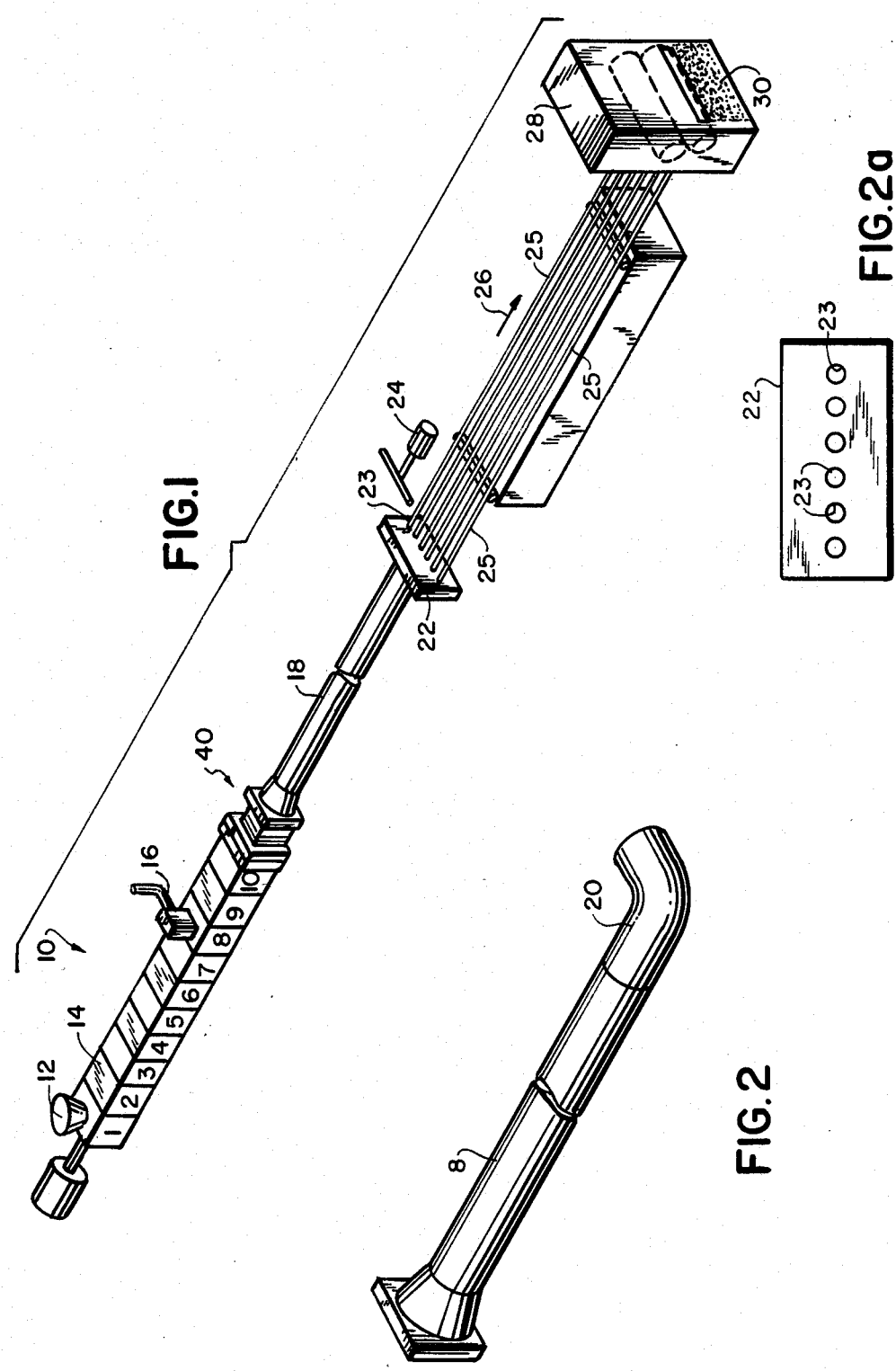

PROCESS FOR PREPARING CEREAL PRODUCTS

FIELD OF THE INVENTION

The present invention is concerned with a non-conventional process for preparing ready-to-eat cereal products. More particularly, the present invention is concerned with the manufacture of different varieties of ready-to-eat cereal products utilizing substantially the same process.

BACKGROUND OF THE INVENTION

Until late in the nineteenth century, the processing of cereals was essentially the same as that used in Biblical times, namely grinding between stones. With the introduction of modern roller mills, the physical and chemical properties of the cereal grain became important, and fractions of the cereal grains became available for special uses. Chemists were called on to determine the composition of these fractions, to establish specifications for those most useful, and to devise processes leading to better cereal products.

Through the years different processes for preparing ready-to-eat cereal products have evolved. Today, the process selected by a manufacture would depend on the end product desired. The manufacture of ready-to-eat cereal by the major manufacturers has been restricted to about three processes. For instance, if a flaked cereal is desired, the manufacturing steps required are as follows: Batch cooked—The cereal materials are cooked in a rotary steam cooker. The cooked product is discharged and broken into small pieces or grits which are dried and flaked; Continuous cooked—The rotary steam cooker is replaced by a steam locked auger wherein the product is cooked under steam as it passes through the auger. The material is discharged as grits, or can pass into a sizer or former then flaked or shredded in other cereal forms; Utilization of an Extruder—The cooked cereal matrix passes into an extruder and is formed into a desired shape and form. The cereal forms mention above can also be gun puffed into an expanded cereal.

Extruders have been used for the preparation of ready-to-eat cereal products. However, it has been generally used for the preparation of expanded or puffed cereals in an attempt to replace the somewhat antiquated gun puffing process. Extruders are also being used as cookers and formers, particularly in the pet food industry. One of the major drawbacks of the use of extruders in the manufacture of ready-to-eat cereal products is the uncooked or undeveloped cereal flavor profile which results from the short residence time within the extruder which does not permit the desired physical and biochemical reactions which are necessary to develop an acceptable flavor profile. Almost as important as the ability to develop flavor is the development of acceptable color which is unattainable because of the short residence time within the extruder.

Another effect of the limited residence time within the extruder is the extremely high temperatures that are most often utilized, which generally cause undesired degradation of the formula components particularly in the cereal manufacture. These high temperatures result in spontaneous expansion within the food product due to the release of steam as the food drops to atmosphere pressure as it exits the extruder through the die. While desirable in expanded products (puffed), this expansion can have an undesirable effect on the more dense cereal products.

The use of a post extrusion tube fitted at the distal end of an extruder to accomplish a universal process for the manufacture of substantially all types of cereal products have not been accomplished to date. A tubular attachment, however, has been used to incorporate additives into extruded food products. For instance, U.S. Pat. No. 4,454,804 by McCulloch discloses a cylindrical bore attachment to the external face of the extruder die plate which has the same cross-sectional area and shape as the die orifice of the extruder. As the product passes through the die into the cylindrical bore while under pressure, one or more liquid additives are injected under pressure into the body of the extrudate. As the extrudate exits the cylindrical bore it expands to form a porous structure.

U.S. Pat. No. 3,496,858 by Jenkins discloses an extension tube attached at the die face wherein the extrudate passes into the extrusion tube attachment as it exits the extruder for further texturization. The extension tube has a diameter similar to that of the die orifice. However, temperature and pressure within the tube is normally atmospheric which allows for some expansion. Also, the presence of a die plate restricts the outlet of the product. Further, U.S. Pat. No. 3,861,287 by Menser discloses an apparatus containing a cooking feed screw and a cooling feed screw. The material being treated may be expelled prior to entering the cooling feed screw or it may be routed through the cooling feed screw for further treatment.

U.S. Pat. No. 4,128,051 by Hildebolt discloses a confined treatment zone in communication with the extrusion die wherein the extruded protein material passes and is subjected to steam which further texturizes the protein.

The above references disclose a variety of post extrusion treatments. These treatments generally occur within a tubular attachment adjacent to the die plate. Further, none of the references are directed to the production of a ready-to-eat cereal product, or a process for preparing same. The tubular extensions are either directed to enhance texturization of vegetable protein products or to produce dual textured product.

The output performance of an extruder is generally dependent upon the effectiveness of solids conveyance within the extruder. It has been found that the frictional properties of an extruder wall have a direct and important effect on how efficiently the material will be moved through the extruder and hence will affect the output of the extruder. In the case of a post extrusion tube or attachment tube, none of the references disclose an interior lining for the purpose of reducing friction within the tube. However, U.S. Pat. No. 4,309,115 by Klein et al, discloses changing the coefficient of friction within a plasticating extruder to improve solids conveyance by coating the inner surface of the extruder barrel with a special material.

It is, therefore, an object of the present invention to provide a single process and apparatus adaptable for the preparation of most farinaceous products.

Another object of the present invention is to provide a single process and apparatus adaptable for the preparation of a cereal product.

A further object of the present invention is to provide a process and apparatus adaptable for the preparation of a flaked cereal product.

Yet another object of the present invention is to provide a process and apparatus adaptable for the preparation of a puffed cereal product.

Still a further object of the present invention is to provide a process and apparatus for the preparation of a cereal grit.

SUMMARY OF THE INVENTION

The present invention is concerned with a cooking apparatus and process for food products wherein the apparatus comprises an extruder and a hollow attachment connected at the discharge end of the extruder, said attachment being of sufficient area and length to sufficiently completely cook the food product in an enclosed environment and wherein the internal surface of the hollow attachment is of sufficient smoothness to promote passage of the food product therethrough; and the process comprises feeding a farinaceous material into an extruder; adding sufficient moisture to the farinaceous material within the extruder to form a dough; heating the dough within the extruder for a time and at a temperature and pressure effective to raise the temperature of the dough to temperatures sufficently high to initiate gelatinization of the starch and denaturation of the protein; discharging the heated farinaceous dough into a hollow attachment connected at the discharge end of the extruder for an effective time and at an effective temperature and pressure and said attachment being of sufficient area and length to completely gelatinize the starch, denature the protein and cook the farinaceous material in an enclosed environment and wherein the internal surface of the hollow attachment is of sufficient smoothness to promote passage of the farinaceous dough therethrough; cooling the cooked farinaceous mass after discharge from the attachment; sizing the cooled cooked farinaceous mass to a desired shape or form; and, drying the shaped or formed mass to a desired moisture content.

FIG. 1 is a perspective view of the apparatus illustrating an extruder, a hollow attachment with a die plate attached at the discharge end, optional cutter and cooking conveyer and a optional pelletizer at the end of the conveyer.

FIG. 2 illustrates the hollow attachment with the optional restrictive elbow.

FIG. 2a illustrates the die plate.

DETAILED DESCRIPTION

The present invention is concerned with an apparatus and method for the preparation of a wide variety of ready-to-eat cereal product with substantially the same process.

The apparatus of the present invention comprises an extruder which includes a hollow barrel or housing extending axially between an upstream and downstream end and a screw conveyer therein. The housing or barrel surrounds substantially all of the screw. Also, an outer wall is provided which generally contains a suitable heat transfer medium. It is further possible in the present invention to heat or cool the hollow internal section of the barrel where the screw conveyor is housed, so that the product to be handled has the optimum temperature at various points. Generally, heat is provided within the extruder barrel as a result of friction or shear. However, further heat can be applied through injection ports located along the length of the barrel, wherein steam can be injected directly into the product being extruded. Lastly, heat can be applied by externally applying heat to the extruder barrels.

At the upstream end of the extruder is located an inlet port 12 where food materials are fed to the extruder. A reservoir of the food material to be extruded is generally held in a hopper which provides a continuous flow of food material to the inlet port of the extruder or by direct feeding means. Once the food material enters the barrel, rotation of the screw conveyor within the barrel advances the food material through the extruder.

An Extruder, generally, is divided into several functional zones, namely, conveying zones 2 and 3, mixing zones 4 and 5, a heating or cooking zones 6 and 7 and cooling zones 8, 9 and 10. All these zones can be manipulated depending on the finished product desired. Typically, the food material enter conveying zones 2 and 3 where limited mixing, heating and cooling takes place. The food material then passes into mixing zones 4 and 5 where optionally moisture and/or other ingredients can be added and a dough is formed. The dough then passes into heating or cooking zones 6 and 7 where heat is generated and controlled by means of friction, heat transfer or direct steam addition. After heating, the product is optionally vented 16 to lower the moisture prior to adjusting the exit temperature of the product as it passes into the final zone. The final zones 9 and 10 are generally a temperature adjusting zone.

The heated farinaceous dough or mass then passes directly into hollow attachment 18 connected at the discharge end of the extruder, said attachment being of sufficient area and length to completely gelatinize the starch, denature the protein and cook the food product in an enclosed environment and wherein the internal surface of the hollow attachment is of sufficient smoothness to promote passage of the food product therethrough.

The hollow attachment is positioned in a manner wherein the entire discharge end of the extruder is completely covered, obviating the need for a die and die plate. The area of the attachment can be up to 8 times the maximum area of the discharge outlet of the extruder. It is preferred however that the area of the attachment be about 80% to about 600% of the area of the discharge outlet of the extruder. The discharge end differs between a single screw and a twin screw extruder with the twin screw having a longer cross sectional dimension. The attachment, therefore, should be adjusted to compensate for the type of extruder used keeping in mind the area dimensions.

The length of the hollow attachment can vary depending on the food material being processed. Generally, the length of the hollow attachment should be at least 3 times the longest cross-sectional dimension of the discharge outlet of the extruder. However, the length of the hollow attachment can be as long as about 1,000 times the longest cross-sectional dimension of the discharge end of the extruder. The most suitable length, however, is the length necessary to permit the desired physical and chemical reaction necessary to produce the desired end product which generally ranges from 10 to 100 times the longest cross-sectional dimension of the discharge outlet of the extruder.

As a result of the limited residence time a food material is exposed to in a conventional extruder, extremely high temperatures most often must be utilized which generally causes undesired destruction of formula components. In the present invention, the hollow attachment allows for the use of lower temperatures for longer periods of time to achieve the desired thermodynamic effect. For instance, residence time necessary to cook or process most food materials utilizing this process generally ranges from 3 minutes to 100 minutes. It is most preferred in the present invention that the area of the hollow attachment ranges from about 80% to 400% of the area of the extruder discharge outlet, and the hollow attachment be of sufficient length to create a residence time within the attachment ranging from 3 minutes to 100 minutes.

Smooth passage of the food material through the hollow attachment is also essential for producing the desired end product. In the present invention, the internal surface of the hollow attachment is treated to alter the coefficient of friction between the surface of the hollow attachment and the food product. This is accomplished by coating or lining the inner surface of the hollow attachment with a low friction material which reduces drag flow within the tube to a minimum, thereby creating a desired plug flow for uniformity of cooking. The low friction material may be a member selected from a group consisting of teflon, polypropylene, filled reinforced plastic, polished metal, metal coatings such as nickel and the like. It is preferred, however, that the hollow attachment be teflon lined or coated.

The hollow attachment of the present invention is designed to extend the cooking time of the food material in an enclosed environment. However, the temperature of this hollow attachment may be lowered by means of a coolant jacket, maintained by means of an insulative wrap, or increased by means of a heating jacket. Depending on the final product desired, any of the above heat transfer means may be utilized.

The present invention is also concerned with a process for preparing a food product utilizing the apparatus disclosed above. In this process a food material is fed into an extruder. In the present invention the desired food material contains a farinaceous material. The term "farinaceous material" is meant to include a grain material such as wheat, rice, oat, corn, peanut, etc.; flour; grits; full-fat, partially or wholly defatted grain, refined fractions of grain like gluten or starches, as well as lesser optional fractions of desirable non-grain materials such as whole or ground seeds, like sesame seed; beans, like whole defatted soy; other carbohydrate sources such as potato; seeds like sunflower; and/or other fractions such as protein isolates.

The food material generally comprises a combination of materials, said combination being dependant on the final product desired. However this does not exclude the use of a single farinaceous material. The amount of farinaceous material can vary from about 15% to about 100% by weight of the food material on a dry weight basis and preferably from about 40% to about 80% by weight.

A dough is then prepared by mixing the farinaceous material with sufficient water suitable to provide an overall moisture content of the intermixed components of about 12% to about 35% by weight and kneading same, and preferably from about 17% to about 28%. This mixing and kneading process can be carried out in the second mixing zone of the extruder which has temperatures below the cooking or gelatization range of the ingredients. Mixing may also be carried out in a batch process or in a continuous dough mixer and then fed into the extruder, depending on the final product desired.

Typically, liquids are added at barrels 2 or 3. Optionally, other ingredients such as syrups or sweeteners, flavoring agents, fortification such as fibers, protein, vitamins and minerals, inlays including fruits and nuts, starch modifiers such as emulsifiers and the like and combinations thereof may be incorporated into the dough matrix at any appropriate position along the length of the extruder barrel.

The dough then passes into the cooking or heating section of the extruder where it is heated for a time and a temperature and pressure effective to raise the temperature of the dough to temperatures sufficiently high to initiate gelatinization of the starch and denaturation of the protein. The farinaceous dough is heated within the extruder to temperatures ranging from about 212° F. to about 300° F., and preferably from about 235° F. to about 275° F. These temperatures are necessary to begin the gelatinization and denaturation process. At this temperature the dough may also be subjected to specific mechanical energy which also contribute to the energy source necessary to heat/cook the farinaceous dough.

The pressure within the extruder is generally within the range of 5 to 2,000 psig and preferably from 10 to 150 psig.

The torque conditions within the extruder are controlled to provide low to moderate torque. This required the use of a screw design within the extruder which will provide the desired torque conditions. The work done on the dough within the extruder is about 20 to 40 watt hours per pound feed which is calculated by the amperage and voltage with only water in the extruder.

The dough within the extruder is heated using an external heat source to cause the setting up of the gluten and the gelatinization of the starch. The temperature within the extruder is maintained sufficiently high so that the heat applied when combined with the heat resulting from the frictional energy results in the extrudate emerging from the extruder having a temperature in the range of about 212° F. to about 300° F., and preferably from about 235° F. to about 275° F.; and, pressure ranging from about 0 psig to about 500 psig, and preferably from 10 psig to 100 psig.

Optionally, the moisture of the farinaceous dough can be lowered as the dough passes from the cooking zone to the temperature control zone by venting means or ports connected adjacent to the distal end of the extruder. These ports act to lower the moisture of the farinaceous dough up to about ½% of the total moisture. The moisture is generally lowered from about 23%–30% to about 14%–22%.

The heated farinaceous dough is discharged from the extruder 40 into hollow attachment 18 connected at the discharge end of the extruder for an effective time and at an effective temperature and pressure, and said attachment being of sufficient area and length to completely gelatinize the starch, denature the protein and cook the farinaceous dough in an enclosed environment and wherein the internal surface of the hollow attachment is of sufficient smoothness to promote passage of the farinaceous dough there through.

The hollow attachment is connected to the discharge end of extruder 40. Since no restrictor die is necessary, the heated farinaceous dough passes directly into the hollow attachment. The area of the hollow attachment which contacts the discharge end of the extruder is up to 8 times the maximum area of the extruder discharge outlet and preferably from about 80% to about 600% of the area of the extruder discharge outlet.

The length of the hollow attachment affects the degree of cook which is necessary to promote flavor development; complete the gelatinization of the starch; swell the grain fractions, especially bran; enhances color development due to caramelization and maillard reaction; promotes textural enhancement and, control the loss of volatile flavor components. The length of time the farinaceous dough remains in the hollow attachment is also a factor which affects the finished product desired. The length of the hollow attachment and the inlet feed rate of the extruder generally determines the residence time within the hollow attachment, hence, the degree of cook that is achieved. Residence time within the hollow attachment generally ranges from about 3 minutes to about 100 minutes, and preferably from about 10 minutes to about 40 minutes.

Further, the length of the hollow attachment is also dependent on the finished product desired. Typically, the length of the hollow attachment is at least 3 times the longest cross-sectional dimension of the discharge outlet of the extruder. However, the length can range from 3 times the longest cross-sectional dimension of the discharge outlet of the extruder to about 1000 times the longest cross-sectional dimension of the discharge outlet of the extruder.

To facilitate passage of the farinaceous dough through the hollow attachment, the attachment is lined with a low friction coating on its inner surface which minimizes drag flow within the attachment, thereby creating a desired plug flow for uniformity of cooking. The preferred low friction coating is teflon, but should not be restricted thereto. Other suitable coatings are listed supra.

The temperature and moisture of the farinaceous dough is maintained as the dough passes through the hollow attachment. The product exiting the attachment generally has temperatures ranging from about 235° F. to about 275° F. and moisture level ranging from about 14% to about 22%.

As the cooked farinaceous dough exits the hollow attachment, an explosive discharge may be encountered as a result of the increased partial gas pressures generated by the product. This can be eliminated by creating a back pressure greater than the induced partial pressure of the product. This back pressure can be effectively created by means of restrictive adjustable bolts, a 90° elbow or the like.

Depending on the final product desired, an optional die plate 22 containing orifices 23 may be attached at the discharge outlet of the hollow attachment. The presence of a die plate can cause an increase in back pressure within the hollow attachment ranging from about 50 psig to about 2000 psig. Preferred pressures, however, range from 90 psig to 500 psig. The product exiting the die orifice is generally in the form of a rope 25 which is subsequently cut into a desired size 30 for subsequent processing. The shape of the die orifice can also vary depending on the end product desired.

The cooked mass exits the hollow attachment and is cooled to temperatures ranging from 50° F. to 200° F. In the case of a flaked product, the cooked, cooled mass is reduced to a suitable size for flaking. In cases where a die is used, pellets can be cut directly at the die face 22 or a rope can be produced and pellets formed later by suitable means 30. The moisture content after cooling ranges from about 8% to about 20% and preferably from about 12% to about 18%.

The cooled mass is then shaped based on the final product desire. Typically, shaping is accomplished by a comminution mill or by other means such as shredding and grating rolls, briquetting means, pelletizers, flaking rolls and the like.

The shaped product can then be toasted or dried to a moisture content ranging from about 2% to about 10% and preferably from 2% to 4% depending on the final product desired.

The following examples illustrate the preferred embodiments of the present invention.

EXAMPLE 1

Whole wheat was wetted to moisture of 28% and then "bumped" through a conventional serrated roller mill to crush the wheatberry without destroying its integrity. This wetted "bumped" wheat was then allowed to moisture equilibrate for 2 hours. Red and white wheat brans were preblended at a ratio of 60% red, 40% white.

A digested flavoring syrup was prepared by mixing together water at 1.5%, liquid sugar at 74.8%, corn syrup at 7.5%, wheat flour at 5.4%, malted barley flour at 4.3%, and salt at 6.5%. This slurry was heated to 150° F. and allowed to digest for 45 minutes. The temperature was then raised to 180° F.

The bran mixture and the wetted "bumped" wheat (60:40) were preblended and fed to a Werner-Pfleiderer C-120 twin screw extruder at a rate of 1000 lbs/hour. A 10 section extruder with a low shear configuration was used. Three forward kneading zones were interspersed along the extruder shafts. Cold water (55° F.) was circulated through the feed inlet barrel (#1). A digested flavor syrup was injected into Section 2 at a rate of 400 lbs/hr. Sections 2, 3, 4, 5 & 6 were heated to 275° F. by circulating hot oil thru the jackets. Barrels 7 & 8 were not heated. Section 8 contained a vent port for the release of vapors. Sections 9 & 10 were variably heated to maintain a product temperature of 262° F.

An "eight to 0" adapter was fitted to the end of the extruder to form a smooth transition between the "eight" shape of the extruder discharge, and the "O" shape of the post extrusion devise.

The post extrusion device used was a teflon lined 20 feet pipe having a diameter at 10 inches bolted to the discharge outlet of the extruder, said extruder having a diameter of 8 inches.

The operating conditions were as follows. Feed rate of bran and bumped wheat, 1000 lbs./hr. Digested syrup rate, 400 lbs./1 hr. Extruder RPM, 150 extruder torque 30%. Extruder discharge pressure, 180 psig. Post extrusion device pressure, essentially zero (open at discharge end). Discharge temperature, 260°–262° F.

The material discharged from the post extrusion device was manually broken into lumps about the size of a man's fist. These lumps were cooled for several minutes to a temperature of about 190° F., then milled into small particles using an Urschel Comitrol, operated at 2300 rpm, using a "300 u head", and a straight 3 bladed impeller.

The particles were then cooled briefly to avoid sticking together, and then flaked conventionally on hydraulically loaded flaking rolls at about 500 psi, or a pressure sufficient to create a flake of 0.025". These flakes were then dried and toasted in a forced air drier at 280° F. for 5 minutes.

EXAMPLE 2

Corn grits were covered with warm water and soaked for 8 hours. A cooking syrup was prepared separately by placing 61 parts liquid sugar, 18 parts salt, 16 parts corn syrup and 5 parts malt syrup, in a jacketed kettle. The syrup was heated to 150° F. with constant mixing.

A 57 mm Werner & Pfleiderer twin screw extruder with 10 section was used (3.5 inches in diameter outlet). A moderate shear screw configuration containing 5 kneading zones was placed in the extruder. Cold water (55° F.) was circulated thru the first section containing the feed inlet. The next 5 sections were heated to 250° F. by circulating hot oil thru the jackets. The 8th section contained a vent port and was not heated. The last two sections, 9 & 10, were cooled to 195° F. using cold water in the jackets.

The four foot sections of 4 inch diameter teflon lined pipe (Resistoflex TFE Teflon lined pipe made by Resistoflex Div. of Crane Co.) were attached directly to the extruder outlet. A die containing 6 holes 5/32" in diameter was attached to the end of the last tube of the attachment.

After soaking, the water was drained from the corn. The corn was then placed on a cooling screen, where surface moisture was removed. The prewetted corn grits, at 25% moisture, were placed in an Acrison feeder and fed continuously into the hopper of the extruder at a rate of 72.4 lbs./hr.

The heated syrup was pumped continuously into a port in the second section of the extruder, at a rate of 27.6 lbs./hr. Additional water was also added at the same location, to adjust the moisture of the final product. Typically, this was held at 16 lbs./hr.

The extruder was operated at 200 rpm, which resulted in a torque of 30%, and a pressure of 350 psi at the end of the extruder.

The corn, at this rate, had a retention time of 15 minutes in the attachment. The temperature of the corn exiting the die was 240° F.

As the strands of corn left the die at the end of the attachment, they were directed over a (Kamflex®) continuous belt conveyor where they were cooled to 130° F. by pulling air through the perforated belt. The cooled strands were sized using a Conair strand cutter, by operating the feed roll at about 130 rpm and the cutter roll at about 150 rpm to form pellets about ¼" long.

These pellets at about 18% moisture were aircooled at 100° F. to 120° F. and fed directly to Ferrel Ross flaking rolls. Flakes were formed about 0.025 to 0.030 of an inch thick and fed directly to a Jetzone® toasting oven to a moisture of 2.5%.

EXAMPLE 3

Equal parts of yellow corn meal and second head rice were blended in a ribbon mixer. This mix was placed in an Acrison feeder and fed continuously to a 57 mm Werner & Pfleiderer twin screw extruder and attachment as in Example II at a rate of 3.3 lbs./min.

A cooking syrup was prepared by placing 85 parts liquid sugar, 9 parts malt syrup, 7 parts salt, in a jacketed kettle. The syrup was pumped from the kettle continuously with a small Moyno pump and into the extruder port between the first and second barrels at a rate of 1.5 lbs./min.

The extruder was operated at 250 rpm which resulted in a torque of 28%, and a pressure of 300 psig at the end of the extruder. The product at these conditions had a retention time of 20 minutes in the extruder and attachment. The temperature of the corn exiting the attachment die was 250° F.

The hot extruded strands were air cooled on a Kamflex® conveyor, and cut on a Conair® strand cutter as in Example 2.

The pellets were further cooled on a portable batch cooling screen until they were between 100°-120° F. At this point the moisture was 22%.

The cooked corn rice pellets were immediately fed to a set of shredding rolls (Douglas Engineering) with a 1/16"×⅛" rectangular pattern. This produced a webbed sheet of cooked, wet dough 6" wide. Two layers of webbed sheeted were fed into the attached cutting and dicing mechanism, to product ⅝"×⅝" in double layered bite sized pieces, which were fed directly into a 2 Zone Wolverine Jetzone® oven. The first zone was operated at 480° F., with an airflow created by a pressure differential of 2.2" water gauge. The second zone was operated at 320°, with an air pressure of 0.8. The conveyor was set so as to provide approximately 1 minute retention time. At the discharge of the Jetzone® the product was cooled to ambient conditions with a Jetzone® cooler.

We claim:

1. A process for preparing a food product comprising the steps of:
   (a) feeding a farinaceous material containing protein into an extruder;
   (b) adding sufficient moisture to the farinaceous material within the extruder to form a dough;
   (c) heating the dough within the extruder for a time and at a temperature and pressure effective to raise the temperature of the dough to temperatures sufficiently high to initiate gelatinization of the starch and denaturation of the protein;
   (d) discharging the heated farinaceous dough into a hollow attachment connected at the discharge end of the extruder for an effective time and at an effective temperature and pressure and said attachment being of sufficient area and length to completely gelatinize the starch, denature the protein and cook the farinaceous dough in an enclosed environment and wherein the internal surface of the hollow attachment is of sufficient smoothness to promote passage of the farinaceous dough therethrough;
   (e) cooling the cooked dough after discharge from the hollow attachment;
   (f) sizing the cooked, cooled farinaceous dough to a desired shape or form, and
   (g) drying the shaped or formed farinaceous dough to a desired moisture content.

2. A process according to claim 1 wherein the farinaceous material is a member selected from a group consisting of corn, wheat, rice, barley, soy, potato, rye, oat and combinations thereof.

3. A process according to claim 1 wherein the moisture of the farinaceous material within the extruder is increased to from 12% to 35% moisture by weight of the farinaceous mixture.

4. A process according to claim 3 wherein the moisture of the farinaceous material within the extruder is increased to from 17% to 28% by weight of the farinaceous dough.

5. A process according to claim 1 wherein the farinaceous dough is heated to temperatures ranging from 212° F. to 300° F.

6. A process according to claim 1 wherein the pressure within the extruder ranges from 5 to 2,000 psig.

7. A process according to claim 1 further comprising lowering the moisture of the farinaceous dough within the extruder by venting through a venting port.

8. A process according to claim 7 wherein the moisture is lowered to from 23%–30% to from 14%–22% by weight of the farinaceous dough.

9. A process according to claim 1 wherein the farinaceous dough being discharged into the hollow attachment has temperatures ranging from about 212° F. to about 300° F., moisture ranging from about 23% to about 30% and pressures ranging from about 5 to about 2,000 psig.

10. A process according to claim 1 wherein the area of the hollow attachment which contacts the discharge outlet of the extruder is up to 8 times the maximum area of the extruder outlet.

11. A process according to claim 10 wherein the area of the hollow attachment which contacts the discharge outlet of the extruder is about 80% to 600% of the area of the extruder outlet.

12. A process according to claim 1 wherein the length of the hollow attachment is at least 3 times the longest cross-sectional dimension of the discharge outlet of the extruder.

13. A process according to claim 12 wherein the length of the tube ranges from about 3 times the longest cross-sectional dimension of the discharge outlet of the extruder to about 1000 times the longest cross-sectional dimension of the discharge outlet of the extruder.

14. A process according to claim 1 wherein the residence time within the hollow attachment ranges from about 3 minutes to 100 minutes.

15. A process according to claim 1 wherein the internal surface of the extruder is treated to alter the coefficient of friction between the surface of the tube and the farinaceous dough.

16. A process according to claim 1 wherein the internal surface of the hollow attachment is treated with a member selected from a group consisting of teflon, polypropylene, filled reinforced plastic, polished metals, metallic coatings comprising nickel.

17. A process according to claim 1 wherein the internal surface of the hollow attachment is coated with teflon.

18. A process according to claim 1 wherein the temperature of the cooked dough exiting the hollow attachment ranges from about 212° F. to about 300° F.

19. A process according to claim 1 wherein the moisture of the dough exiting the hollow attachment ranges from about 14% to about 22% by weight.

20. A process according to claim 1 further comprising the attachment of a die plate at the discharge end of the hollow attachment.

21. A process according to claim 1 wherein the shaped or formed farinaceous dough is dried to a moisture ranging from about 2% to about 10% by weight.

22. A process according to claim 21 wherein the shaped or formed farinaceous dough is dried to a moisture ranging from about 2% to about 4% by weight.

23. A process according to claim 16 wherein the temperature of the cooked dough exiting the hollow attachment ranges from about 235° F. to about 275° F.

* * * * *